United States Patent
Small et al.

(10) Patent No.: US 6,893,346 B2
(45) Date of Patent: May 17, 2005

(54) SYSTEM, METHOD, AND APPARATUS FOR BI-DIRECTIONAL INFRARED COMMUNICATION

(75) Inventors: David Small, San Jose, CA (US); James M. Hair, III, Cheyenne, WY (US)

(73) Assignee: Shoot the Moon Products II, LLC, Pleasonton, CA (US)

( * ) Notice: Subject to any disclaimer, the term of this patent is extended or adjusted under 35 U.S.C. 154(b) by 103 days.

(21) Appl. No.: 10/170,489

(22) Filed: Jun. 12, 2002

(65) Prior Publication Data

US 2003/0153387 A1 Aug. 14, 2003

Related U.S. Application Data

(60) Provisional application No. 60/355,278, filed on Feb. 8, 2002.

(51) Int. Cl.⁷ .................................................. A63F 9/24
(52) U.S. Cl. ......................... 463/40; 455/90.2; 398/140
(58) Field of Search ........................ 463/40–42, 49–57; 446/405–407, 473; 42/54–58; 124/3; 342/52–58; 455/73, 90.2; 398/140; 379/56.1, 56.3

(56) References Cited

U.S. PATENT DOCUMENTS

| | | |
|---|---|---|
| 2,100,348 A | 11/1937 | Nicolson |
| 2,494,645 A | 1/1950 | Collins |
| 2,990,471 A | 6/1961 | Tiffany |
| 3,277,303 A | 10/1966 | Jensen et al. |
| 3,705,986 A | 12/1972 | Sanders et al. |
| 3,927,316 A | 12/1975 | Citta |
| 4,008,478 A | 2/1977 | Ikrath et al. |
| 4,056,719 A | 11/1977 | Waaben |
| 4,151,407 A | 4/1979 | McBride et al. |
| 4,249,265 A | 2/1981 | Coester |
| 4,352,665 A | 10/1982 | Kimble et al. |
| 4,456,793 A | 6/1984 | Baker et al. |
| 4,603,975 A | 8/1986 | Cinzori |
| 4,648,131 A | 3/1987 | Kawaguchi et al. |
| 4,689,827 A | 8/1987 | Gurney, Jr. |
| 4,709,411 A | 11/1987 | Mori |
| 4,717,913 A | 1/1988 | Elger |
| 4,823,401 A | 4/1989 | Gammarino et al. |
| 4,936,037 A | 6/1990 | Holcomb et al. |
| 4,959,827 A | 9/1990 | Grotzinger et al. |
| 4,996,787 A | 3/1991 | Holcomb et al. |
| 5,044,107 A | 9/1991 | Holford |
| 5,319,190 A | 6/1994 | Allen et al. |
| 5,359,446 A | 10/1994 | Johnson et al. |
| 5,455,702 A | 10/1995 | Reed et al. |
| 5,495,357 A | 2/1996 | Osterhout |
| 5,648,862 A | 7/1997 | Owen |
| 5,721,783 A * | 2/1998 | Anderson .................. 381/328 |
| 5,763,900 A | 6/1998 | Wang |
| 5,802,467 A | 9/1998 | Salazar et al. |
| 5,835,862 A | 11/1998 | Nykanen et al. |
| 5,904,621 A | 5/1999 | Small et al. |
| 5,995,592 A | 11/1999 | Shirai et al. |
| 6,154,663 A | 11/2000 | Itamochi |
| 6,278,378 B1 | 8/2001 | Feiner et al. |
| 6,281,811 B1 | 8/2001 | Ranzino |
| 6,285,476 B1 * | 9/2001 | Carlson et al. ................ 398/9 |
| 6,302,796 B1 | 10/2001 | Lebensfeld et al. |
| 6,314,401 B1 | 11/2001 | Abbe et al. |

* cited by examiner

Primary Examiner—Mark Sager
(74) Attorney, Agent, or Firm—Blakely Sokoloff Taylor & Zafman LLP

(57) ABSTRACT

An infrared (IR) communication device for audible sound communication over an infrared beam. The IR communication device includes an IR receiver, an IR transmitter, a speaker, and a microphone 210. The IR receiver receives the incoming IR beam. The IR transmitter 206 generates the IR output beam. A pair of IR communication devices form an IR communication system with a pair of IR communication channels. Simplex and full duplex IR communication may be provided over one or a pair of IR communication channels.

39 Claims, 5 Drawing Sheets

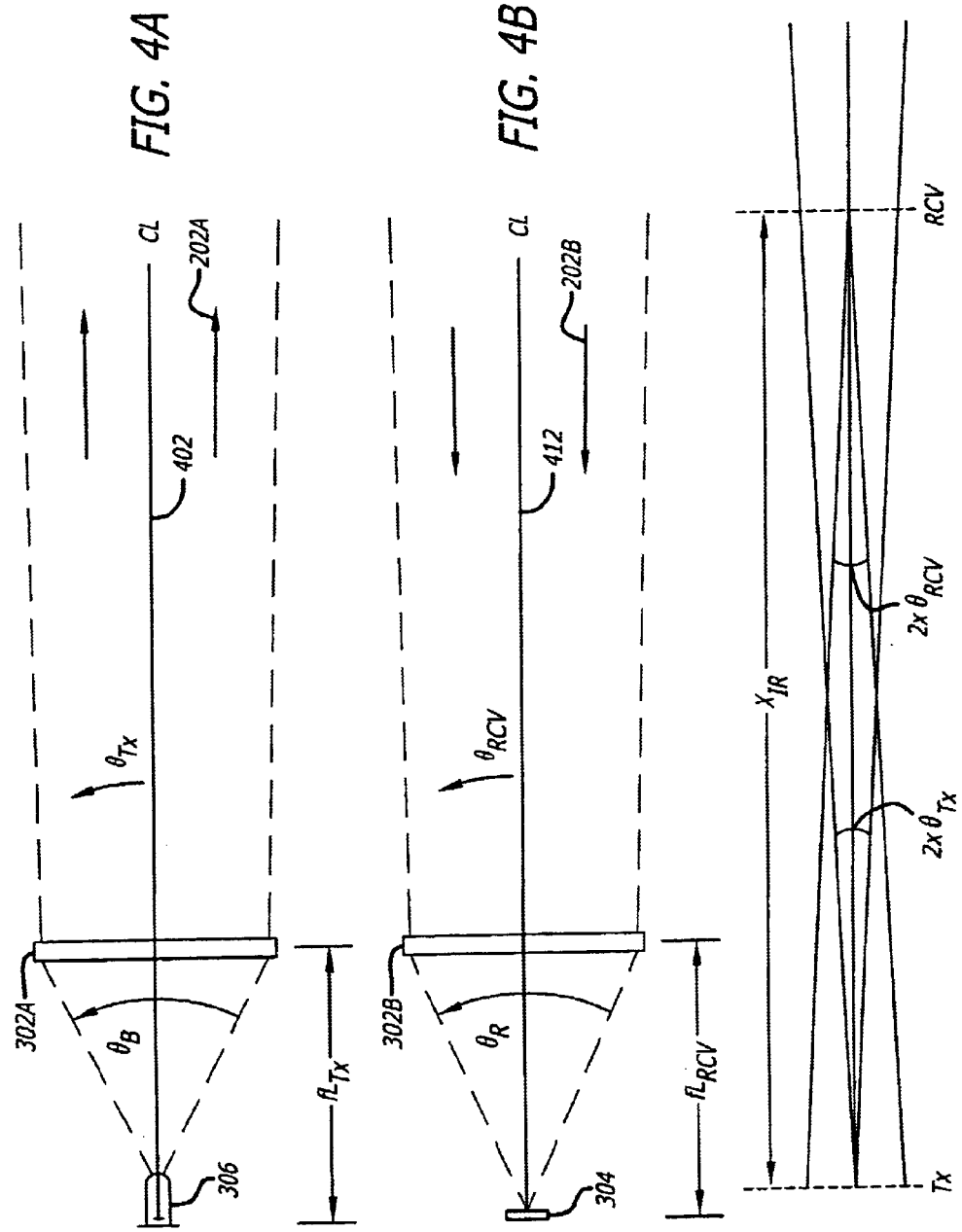

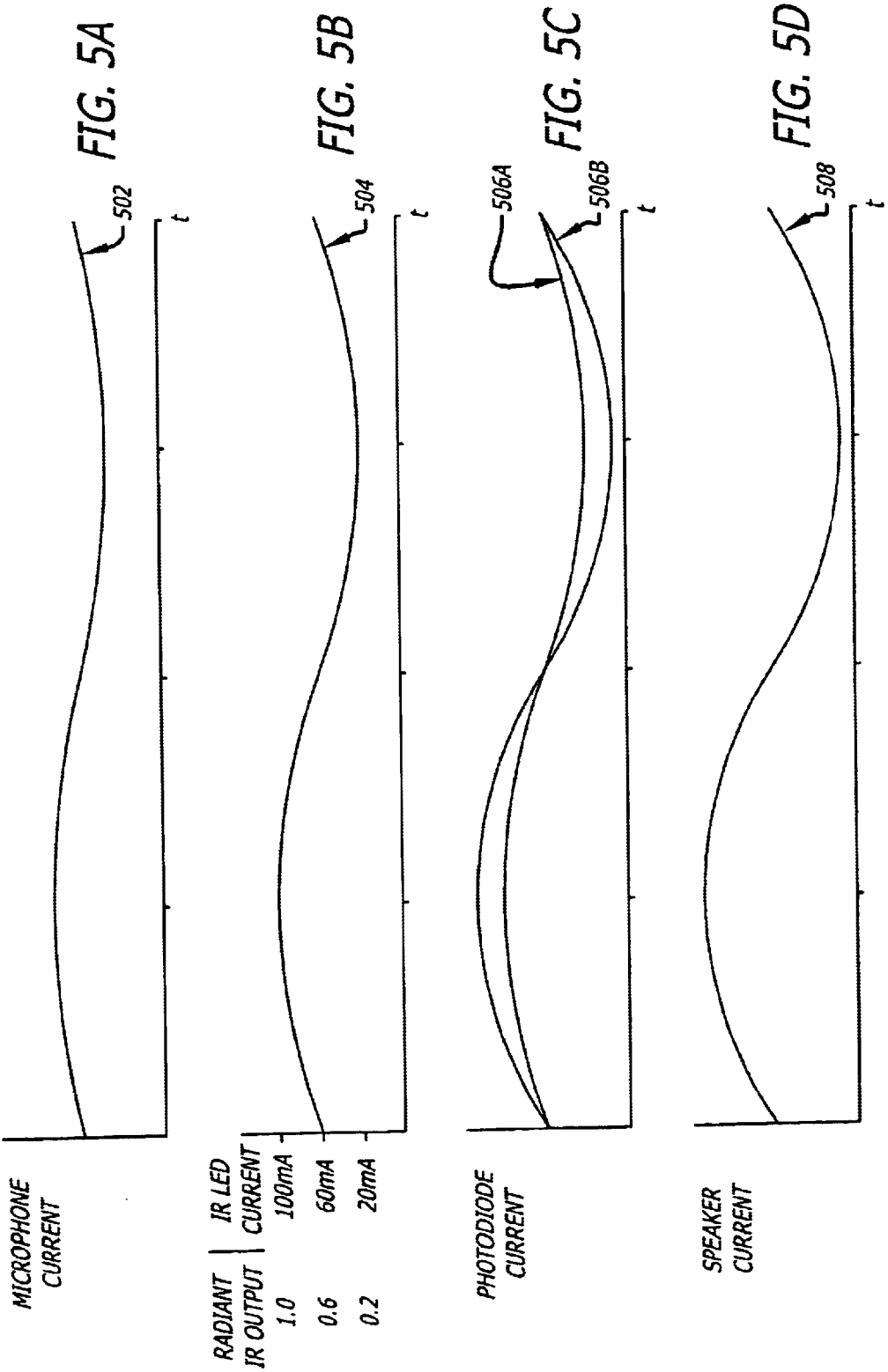

SYSTEM, METHOD, AND APPARATUS FOR BI-DIRECTIONAL INFRARED COMMUNICATION

CROSS-REFERENCE TO RELATED APPLICATIONS

This United States (US) non-provisional patent application filed by David Small claims the benefit of US provisional patent application Ser. No. 60/355,278, filed by David Small on Feb. 8, 2002, entitled "METHOD AND APPARATUS FOR INFRARED COMMUNICATION".

FIELD OF THE INVENTION

The invention relates generally to the field of wireless communication devices. Particularly, the invention relates to infrared (IR) communication devices.

BACKGROUND OF THE INVENTION

The electromagnetic spectrum has frequencies associated with it in which electromagnetic radiation may be radiated. The electromagnetic spectrum can be divided into frequency regions that exhibit common properties useful in science and technology. For example, the audible range of frequencies is approximately between 20 Hertz (Hz) to 20,000 Hz which humans can here. There is a radio frequency band of the electromagnetic spectrum which is allocated for radio, including cellular phones, and television communication systems. Electromagnetic radiation in the radio frequency bands tends to bend around, reflect off of and pass through objects, and thus, is favorable to communication systems. There is a narrow band referred to as the visible spectrum between $3.95 \times 10^{14}$ Hz to $7.90 \times 10^{14}$ Hz over which the radiant energy is visible to a human eye. The visible spectrum may divided into frequencies of color. Just below the visible spectrum is the infrared (IR) frequency spectrum which is in the range between $3 \times 10^{11}$ Hz to $4 \times 10^{14}$ Hz which is not visible to the human eye. More typically, the frequency of electromagnetic radiation in the IR frequency spectrum is expressed in wavelengths because of its light properties. In this case, the wavelength of light ($\lambda$) is proportional to the inverse of the frequency (f) and can be expressed in equation form as $\lambda = C/f$ where C is the speed of light.

Infrared (IR) radiation having properties of light travels in a straight, or line-of-sight, path. IR radiation is blocked by opaque objects and typically reflects well off of only hard, mirror-like surfaces. Thus, electromagnetic radiation in the IR frequency spectrum, referred to as IR radiation, is not typically used in communication systems.

A communication system can be full duplex or simplex. A full duplex communication system provides constant bi-directional communication between users such as a telephone. A simplex communication system provides bi-directional communication between users but not at the same time. A user at each end selects whether he or she wants to talk or listen. A user at one end can not both listen and talk at the same time in a simplex communication system.

BRIEF DESCRIPTION OF THE DRAWINGS

The features of the invention will become apparent from the following detailed description of the invention in which:

FIG. 4A is a cross-sectional view of a light ray diagram for an embodiment of the IR transmitter of the IR communication device.

FIG. 4B is a cross-sectional view of a light ray diagram for an embodiment of the IR receiver of the IR communication device.

FIG. 4C is a cross-sectional view of overlapping light ray diagrams for an embodiment of the IR transmitter and the IR receiver between a pair of IR communication devices.

FIGS. 5A–5D are waveform diagrams illustrating the direct modulation used by the IR communication devices over each IR communication channel.

Like reference numbers and designations in the drawings indicate like elements providing similar functionality.

DETAILED DESCRIPTION OF THE INVENTION

In the following detailed description of the invention, numerous specific details are set forth in order to provide a thorough understanding of the invention. However, the invention may be practiced without these specific details. In other instances well known methods, procedures, components, and circuits have not been described in detail so as not to unnecessarily obscure aspects of the invention.

Figure 1A:
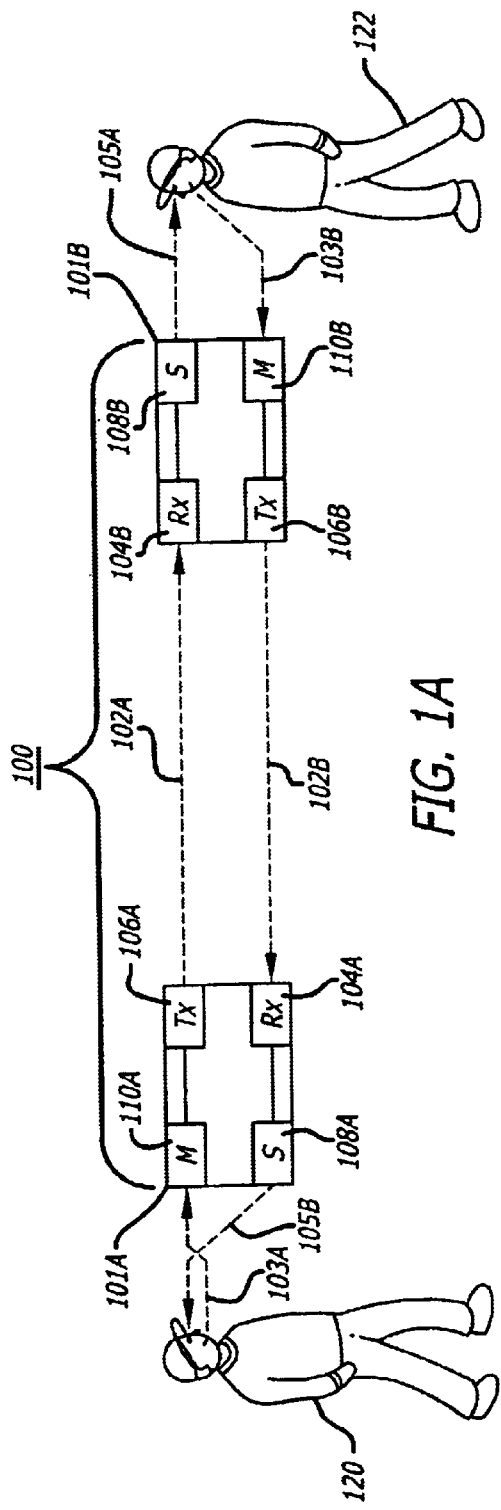
FIG. 1A is a block diagram of an IR communication system.

Referring to FIG. 1A, a bi-directional infrared communication system 100 is illustrated. Between a first IR communication device 101A and a second IR communication device 101B, are two infrared communication channels 102A and 102B. The IR communication channel 102A transmits audible sounds or voice sounds from one IR communication device 110A to another IR communication device 101B. The IR communication channel 102B transfers audible sounds or voice sounds from one IR communication device 101B to another IR communication device 101A.

Audible sounds and audible voice sounds are coupled into an IR communication device for communication over the IR communication channels. The terms audible voice, audible voice sounds, audible sound, voice sound, audible sound/voice input, audible sound/voice output, and reproduced sound is used herein to refer to the audible representation, which may be heard by humans, of both voice sounds initially generated by a voice of a human user and which are reproduced by a speaker, and other audible sounds, other that the voice of a human user, which is generated by mechanical or other means in space and coupled into the microphone, and other audible sounds which are reproduced by a speaker in space. The terms voice signal, voice transmit signal, voice receive signal, received voice signal, electrical transmit voice signal, and electrical received voice signal is used herein to refer to both voice sounds and other audible sounds communicated by electrical signals. The terms infrared voice signal and infrared signal is used herein to refer to the electrical signal representation of both voice sounds and other audible sounds communicated by infrared signals through space.

The IR communication device 101A includes an IR receiver 104A, an IR transmitter 106A, a speaker 108A, and a microphone 110A. The IR communication device 101B includes an IR receiver 104B, an IR transmitter 106B, a speaker 108B, and a microphone 110B. The combination of the infrared transmitter and the infrared receiver may also be referred to as an infrared transceiver.

In one direction of communication, a user 120 provides an audible sound or audible voice sound 103A to the microphone 110A. The audible sound or audible voice sound 103A is converted or transduced by the microphone 110A into an electrical signal which is coupled to the IR transmitter 106A. The IR transmitter 106A converts or transduces the electrical signal into an infrared voice signal which is transferred over the IR communication channel 102A to the IR communication device 101B. The IR receiver 104B of the IR communication device 101B receives the IR voice signal on the IR communication channel 102A. The IR receiver 104B of the IR communication device 101B converts or transduces the IR voice signal into an electrical voice signal and couples it to the speaker 108B. The speaker 108B converts or transduces the electrical voice signal into an audible sound or audible voice sound 105A for an end user 122 to hear.

In another direction of communication, the end user 122 talks and provides an audible sound or audible voice sound 103B to the microphone 110B of the IR communication device 101B. The microphone 110B converts or transduces the audible sound or audible voice sound into an electrical voice signal. The electrical voice signal is coupled to the IR transmitter 106B. The IR transmitter 106B converts or transduces the electrical voice signal into an infrared voice signal and transmits the IR voice signal over the IR communication channel 102B to the IR communication device 101A. The IR voice signal is received by the IR receiver 104A and converted or transduced into an electrical voice signal which is supplied to the speaker 108A. The speaker 108A converts or transduces the electrical voice signal into an audible sound or audible voice sound 105B which is provided to the end user 120. The end user 120 may listen to the audible sound or audible voice sound 105B using his/her hearing. In this manner, bi-directional voice communication can occur across the two IR communications channels 102A and 102B.

Figure 1B:
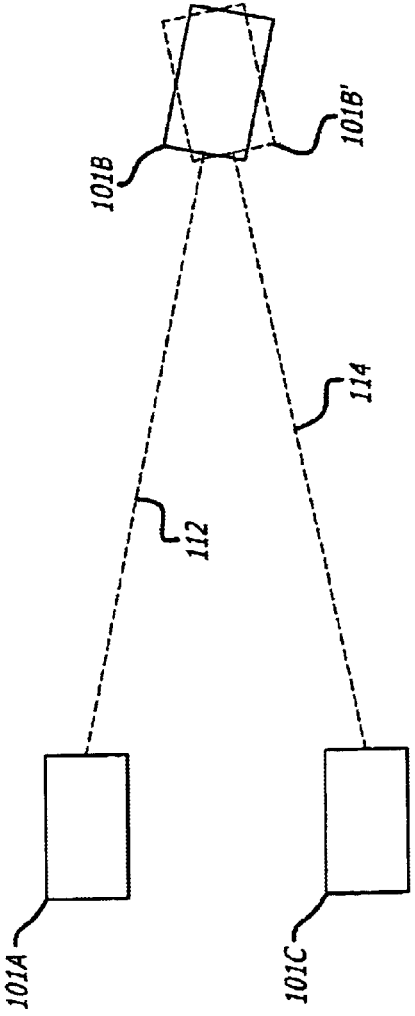
FIG. 1B is a block diagram of illustrating the line-of-sight of the IR communication system between multiple IR communication devices.

Referring now to FIG. 1B, IR communication devices 101A, 102B, and 101C are illustrated. The IR communication devices 101A, 101B and 101C are line of sight communication devices restricted to the spread of a transmitted IR signal and the angle of reception of the IR receiver. In FIG. 1B, IR communication devices 101A and 101B can communicate with each other over a line of sight 112. IR communication device 101B' is a shifted or turned version of the IR communication device 101B. In FIG. 1B, the IR communication device 101C can communicate with the shifted position IR communication device 101B' to communicate over a line of sight 114. Each of the IR communication devices 101C and 101B' may be moved or turned somewhat off of the line of sight 114 and still maintain the IR communication channels between them.

Figure 2:
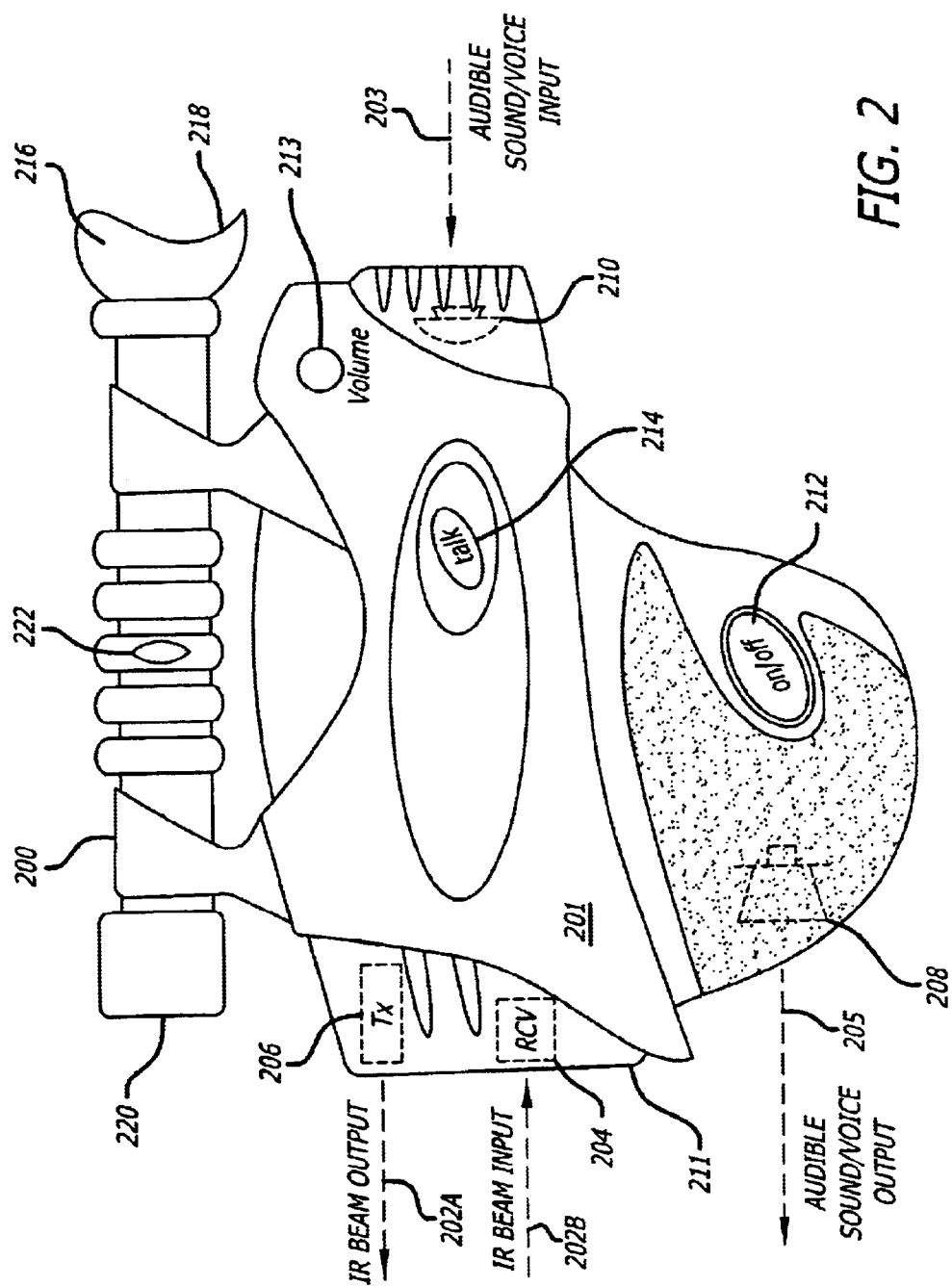
FIG. 2 is a side view of an IR communication device.

Referring now to FIG. 2, an embodiment of an IR communication device 200 is illustrated. The IR communication device 200 represents an embodiment of the IR communication devices 101A–101C. The IR communication device 200 may be used as a toy for voice or vocal communication between a pair of users or children. In which case, a pair of IR communication devices 200 may be packaged together as a toy set for children. Audible sounds other than audible voice sounds may also be communicated from one IR communication device to another.

The IR communication device may be alternately be referred to as an IR walkie-talkie, a two-way IR communication set, an IR transceiver, an IR phone, or an IR communicator. The IR communication device 200 is hand-held and portable. The IR communication device 200 is powered by a battery to eliminate any tethers and facilitate portability. Additionally, the IR communication device 200 provides bi-directional IR signal communication.

The IR communication device 200 receives an audible sound/voice input 203. The audible sound/voice input 203 represents either an audible voice sound or another audible sound. In response to the audible sound/voice input 203, the IR communication device 200 generates an outgoing IR beam 202A for one of the IR communication channels. The IR communication device 200 receives an incoming IR beam 202B from another of the IR communication channels. In response to the IR beam input 202B, the IR communication device 200 generates an audible sound/voice output 205. The audible sound/voice output 205 represents either an audible voice sound or another type of audible sound.

The IR communication device 200 includes an IR receiver 204, an IR transmitter 206, a speaker 208, and a microphone 210. The IR communication device 200 further includes a housing 201 to hold the components together as a unit or set. The IR receiver 204 receives the incoming IR beam 202B. The IR transmitter 206 generates the IR output beam 202A. The IR communication device 200 may further include an on/off switch or button 212 and a sight 216. The on/off switch 212 powers on and powers off the IR communication device 200. The sight 216 allows a user to point the transmitter and receiver of the IR communication device 200 towards another IR communication device to establish a line of sight and the two IR communication channels 102A and 102B. The sight 216 may include an eye cup 218 at one end and an opening 220 at an opposite end. The sight 216 may include optics 222, such as a lens, within its hollow cylindrical sleeve in order to provide additional magnification to obtain the line of sight with the other IR communication device 200 at an opposite end of the communication channel.

The microphone 210 of the IR communication device 200, illustrated as being hidden by a grill or cover, receives the audible sound/voice input 203. The speaker 208 of the IR communication device 200, illustrated as being hidden by a grill or cover, generates the audible sound/voice output 205.

The IR communication device 200 may further include a talk switch or button 214. The talk switch or button 214 may switch the IR communication device from listening to talking. In one embodiment, the talk switch or button 214 disables the speaker 208 to avoid signal feedback. In another embodiment, the talk switch or button 214 need not disable the speaker 208 if sufficient optical and/or electrical isolation is provided in the design of the IR communication device 200 to avoid signal feedback.

The IR communication device 200 may further include a filter or lens cover 211 to filter out unwanted light frequencies or wavelengths as well as provide one or more lenses for the IR receiver 204 and the IR transmitter 206. The filter may bandpass desirable light in the IR spectrum and filter out other stray light sources. The function of the one or more lenses for the IR receiver and the IR transmitter is described further below.

Figure 3:
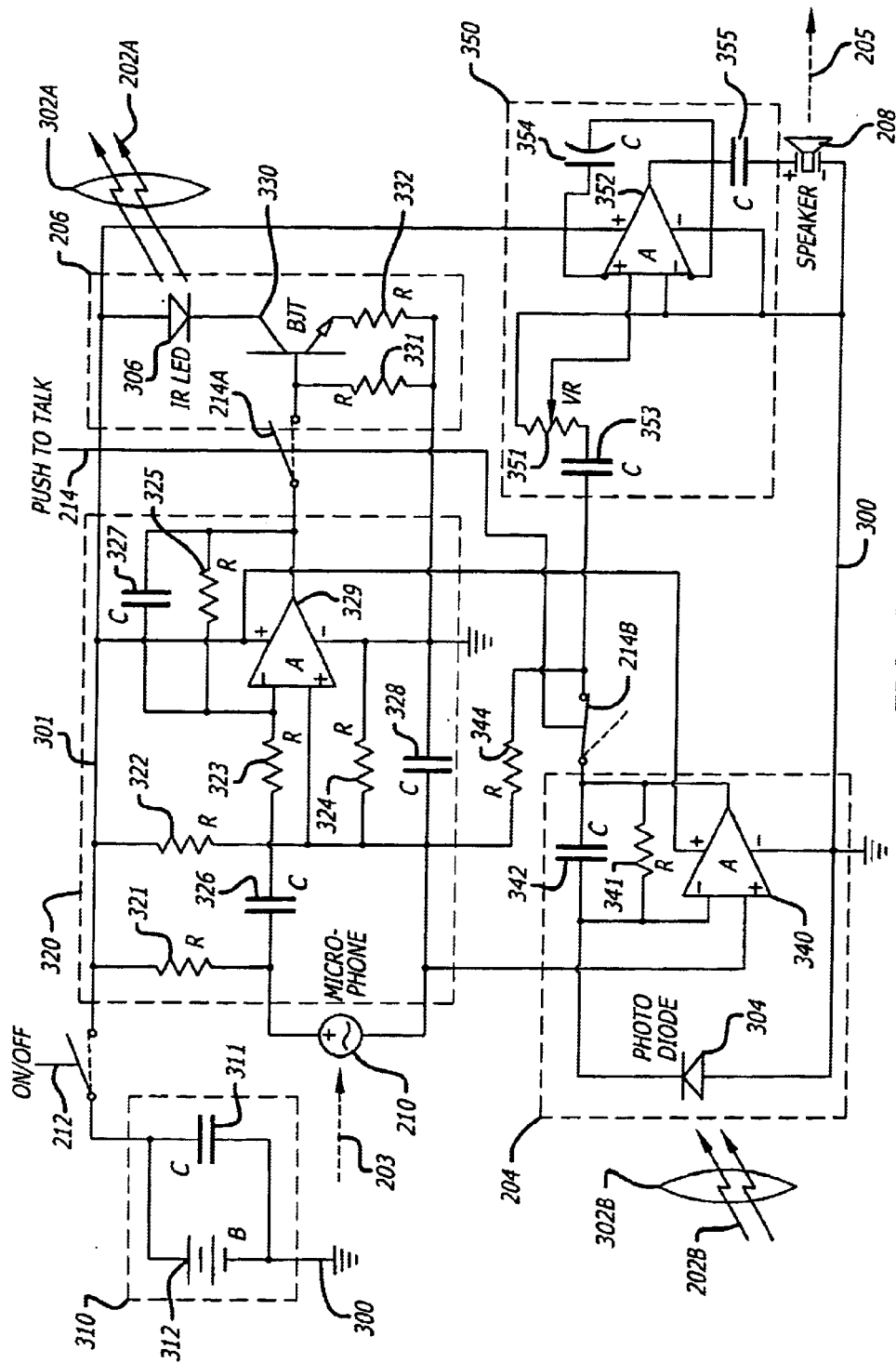
FIG. 3 is a schematic diagram of the components of the IR communication device.

Referring now to FIG. 3, a schematic diagram of the electrical components, optical components, and optoelectronic components of the IR communication device is illustrated. The components and the modulation technology of the IR communication device provide a low cost solution and enable it to be sold as a toy for children.

The optical components include a first lens 302A and a second lens 302B illustrated in FIG. 3. While illustrated as separate lenses, the first lens 302A and the second lens 302B may be the same lens shifted from one position to another or they may be two separate lenses. The first lens 302A focuses the IR output from the IR LED 306 into the IR transmit beam 202A. The second lens 302B focuses the input IR beam 202B onto the photo diode 304.

The opto-electronic components of the IR communication device include an IR photo diode 304 and an IR light emitting diode (LED) 306. The IR photo diode 304 provides the functionality of the IR receiver 204. The IR LED 306 provides the functionality of the IR transmitter 206.

The power supply 310, consisting of a battery 312 and a filtering capacitor 311, is switched on and off to the electrical and opto-electronic components by means of the on/off switch 212. One pole of the on/off switch 212 couples to the power node 301 with the other pole coupled to the power supply 310. The power node 301 couples to the components as illustrated in FIG. 3. A ground or negative power node 300 couples to the components as illustrated in FIG. 3. In one embodiment, the battery 312 is a 9 volt battery and the capacitor 311 is a 470 uf capacitor.

The talk switch or button 214 causes a pair of electrical switches 214A and 214B to alternately be closed and opened. In FIG. 3, switch 214A is illustrated as being opened while switch 214B is closed, in one case for example. When the talk button or switch 214 is pushed, switch 214A closes while switch 214B opens. When the talk button or switch 214 is released, switch 214A is opened and switch 214B is closed. In this manner, the IR communication device may switch back and forth between transmitting an IR beam 202A over an IR communication channel and receiving an IR beam 202B over an IR communication channel. The electrical switches 214A and 214B can be replaced by active transistor devices or logic devices to momentarily connect and interrupt signal flow in order to provide similar functionality.

The speaker 208 transduces an electrical voice signal into an audible voice sound or other type of audible sound as the audible sound/voice output 205. The microphone 210 transduces an audible sound or audible voice sound, the audible sound/voice input 203, into an electrical voice signal.

The microphone 210 is coupled to an input of an amplifier 320. Amplifier 320 includes resistors 321–325, capacitors 326–328, and an operational amplifier 329 coupled together as shown in FIG. 3. The amplifier 320 amplifies the electrical voice signal generated by the microphone 210 into an electrical current signal for coupling through switch 214A into the IR transmitter 206. In one embodiment, the operational amplifier 329 is an LM 358 OPAMP; the resistors 321–325 are 2.2 Kohm, 10 Kohm, 10 Kohm, 10 Kohm, and 100 Kohm resistors respectively; and the capacitors 326–328 are 1 uf, 100 pf, and 470 uf capacitors respectively.

The IR transmitter 206 includes the IR LED 306, a bipolar junction transistor (BJT) 330, and resistors 331–332 coupled together as illustrated in FIG. 3. The IR transmitter 206 receives the amplified current signal representing the voice signal of the microphone 210 and directly modulates the forward current of the IR LED 306. The amplified microphone current signal is coupled into the base of the bipolar junction transistor 330 in order to vary the forward current through the IR LED 306. The IR transmitter 206 functions to convert or transduce an electrical signal input into an infrared light signal output. The output IR light radiation from the LED 306 is a point source and is coupled into the first lens 302 to generate the IR output beam 202A. The first lens 302 collimates the point source into a collimated IR light beam. In one embodiment, the BJT 330 is a JE9013 BJT; and the resistors 331–332 are 100 Kohm and 24 ohm resistors respectively.

The IR receiver 204 includes the photo diode 304, and an operational amplifier 340, a resistor 341 and a capacitor 342. The photo diode 304 generates a current in response to receiving the focused IR light beam of the input IR beam 202B through the second lens 302B. The operational amplifier 340, in conjunction with the resistor 341 and the capacitor 342, amplifies the current generated by the photo diode 304. The amplified current output of the IR receiver 204 is coupled to one pole of the switch 214B. The IR receiver 204 functions to convert or transduce an infrared light signal input into an electrical signal output. In one embodiment, the operational amplifier 340 is an LM 358 OPAMP; the resistor 341 is a 100 Kohm resistor; and the capacitor 342 is a 100 pf capacitor.

Another pole of switch 214B couples to an input of an audio amplifier 350 and the power node 301 through resistors 322 and 344. Switch 214B is closed in order for the audio amplifier 350 to receive the amplified current output signals from the IR receiver 204. The audio amplifier 350 includes a variable resistor 351, an operational amplifier 352, and capacitors 353–355 coupled together as illustrated in FIG. 3. The variable resistor 351 is controlled by the volume control knob 213 in order to vary the input signal to the audio amplifier 352 and therefore control the audible output or volume of the speaker 208. In one embodiment, the operational amplifier 352 is an LM 386 OPAMP; the variable resistor 351 varies from 1 to 10 kohm; the resistor 344 has a resistance of 1 megaohm; and the capacitors 353–355 are 1 uf, 10 uf, and 250 uf capacitors respectively.

The audio amplifier 350 couples to the speaker 208. In one embodiment, the speaker 208 is a ¼W, 8 ohm speaker. The speaker 208 functions to convert or transduce an electrical signal into sound pressure to reproduce an audible sound or audible voice sound as the audible sound/voice output 205.

As previously discussed, the IR communication device may use one or more lenses. The one or more lenses may be used to collimate the light from a point source of the IR LED or focus collimated light from an focal plane to a point source of the IR photodiode.

Referring now to FIG. 4A, a light ray diagram for the IR LED 306 and the lens 302A is illustrated. The lens 302A in one embodiment is a fresnel lens. The center points of the optical axis of the IR LED 306 and the lens 302A are aligned along a center line 402. The IR LED 306 and the lens 302A are separated by a distance referred to as the focal length $Fl_{TX}$. The IR LED 306 radiates at a beam angle $\theta_B$. In one embodiment, the beam angle $\theta_B$ is twenty degrees for example. The lens 302A can collimate the light so that is spreads off of the center line 402 by a transmission angle $\theta_{TX}$. In one embodiment, the transmission angle $\theta_{TX}$ is one and one half degrees for example. In this manner the IR output light beam 202A can travel a long distance as a high intensity IR light beam.

Referring now to FIG. 4B, a light ray diagram for the IR photodiode 304 and the lens 302B is illustrated. The lens 302B in one embodiment is a fresnel lens. The center points of the optical axis of the IR photo diode 304 and the lens 302B are aligned along a center line 412. The IR photodiode 304 and the lens 302B are separated by a distance referred to as the focal length $Fl_{RCV}$. Incoming IR light 202B in the focal plane along center line 412 and off of the center line by a reception angle $\theta_{RCV}$, is focused by the lens 302B down to a point of the reception area of the IR photodiode 304. In one embodiment, the reception angle $\theta_{RCV}$ is one and one half degrees. In one embodiment, the reception area of the IR photodiode 304 is seven square millimeters for example. The radiant sensitive area of the IR photodiode 304 is positioned at or near the focal point of lens 302B. In one embodiment for example, the focal length of lens 302B is 2.4 inches.

Typically, the IR LED 306 and the IR photodiode 304 are a matched pair. That is, the IR LED 306 and the IR photodiode 304 are constructed to transmit and receive IR radiation around the same center frequency or wavelength. For example, the IR LED 306 and the IR photodiode 304 have a center wavelength of 850 nanometers (nm) around which they can transmit and receive IR radiation. As another example, the IR LED 306 and the IR photodiode 304 have a center wavelength of 950 nanometers (nm) around which they can transmit and receive IR radiation. Other center wavelengths and frequencies may be used.

The IR communication device 200 may be used for simplex or full duplex bi-directional communication with proper optical and/or electrical isolation to avoid signal feedback. Each of the IR communication channels 102A and 102B may have the same center frequency or wavelength of IR radiation or they may have a different center frequency or wavelength of IR radiation. Using one IR communication channel, all the voice signals communicated in each direction are found on the same center wavelength or frequency. Because the IR radiation is light, there is little interference when signals cross over the IR communication channel between the IR communication devices 200.

Alternatively, two IR communication channels may be provided, one for each direction of communication. In this case a different center frequency or wavelength is provided for the IR communication channel 102A from that of the IR communication channel 102B. The IR LED 306 and IR photodiode 304 are matched across a pair of IR communication devices improving the quality of the IR communication between IR communication devices in the case of simplex or full duplex bi-directional communication.

Referring now to FIG. 4C, a light ray diagram illustrates the functionality of one IR communication channel and the line of sight between two IR communication devices 200. FIG. 4C illustrates a single IR communication channel between an IR communication device which is transmitting and another IR communication device at an opposite end which is receiving. The IR communication devices are separated by a distance $X_{IR}$, referred to as an infrared communication distance At each end of the light ray diagram may be a lens of the IR communication device. The lens in front of the IR receiver provides an angle of reception which is twice the angle of $\theta_{RCV}$ ($2 \times \theta_{RCV}$). The lens in front of the IR transmitter on an opposite end of the communication channel provides an angle of transmission which is twice the angle of $\theta_{TX}$ ($2 \times \theta_{TX}$). In one embodiment the angle of reception $2 \times \theta_{RCV}$ is equal to the angle transmission $2 \times \theta_{TX}$.

The distance $X_{IR}$ is more a function of the optical gain on the receiving side of the communication channel. The line of sight between the IR communication devices at each end of the communication channel is a function of the beam spread and the angle of acceptance. The beam spread is the amount the IR transmitted beam from one end of the IR communication channel is spread out to the angle of transmission $2 \times \theta_{TX}$. In one embodiment $2 \times \theta_{TX}$ is 3 degrees and the angle of reception or acceptance $2 \times \theta_{RCV}$ is 5 degrees. Each of the lenses in front of the IR receiver and the IR transmitter can affect $\theta_{RCV}$ and $\theta_{TX}$ respectively.

In a preferred embodiment, a fresnel lens is used in front of the IR receiver to provide and improve optical gain on the receiving side of the IR communication channel. Using a fresnel lens in front of each of the IR transmitter and receiver has resulted in a range of $X_{IR}$ from approximately five feet to three thousand feet. In another embodiment, no lens is used in front of the IR photodiode 304 such that the range of distance of $X_{IR}$ is substantially reduced to approximately zero feet to fifty feet.

Because of the line-of-sight communication between the IR communication devices, its difficult for a third party to tap or eavesdrop on the communication between end users. Thus, the modulation or encoding scheme can be simple and not complex resulting in lower costs and still provide protected communication between end users.

Referring now to FIGS. 5A, 5B, 5C, and 5D, exemplary waveforms illustrate how a voice signal representing audible sounds or voice sounds is detected by the microphone and directly modulated onto the IR transmitter at one end of the IR communication channel; and then detected at the infrared receiver and presented to the speaker at the other end of the IR communication channel.

In FIG. 5A, waveform 502 is illustrated. Waveform 502 represents a current waveform which is generated by the microphone receiving audible sounds or voice sounds and the amplifier 320 amplifying the voice signal of the microphone. The current waveform 502 is coupled through to the IR transmitter 206.

FIG. 5B illustrates a waveform 504 to indicate the current flowing through the infrared LED 306 and the resultant infrared LED output signal 202A. The relationship of the infrared LED current to infrared radiant output intensity is generally a linear function. Therefore, the infrared transmitter 206 generates infrared light at intensity levels that are directly responsive to the amplified microphone signal 502 of FIG. 5A.

FIG. 5C shows waveforms 506A and 506B to illustrate the current that may be generated by the photodiode of the IR receiver 204 of FIG. 2. Waveform 506A is illustrated as having a lower amplitude current signal than that of waveform 506B. A lower or higher amplitude of current signal is a direct result of the amount of infrared light incident on the photodiode 304 of the IR receiver 204. Waveforms 506A and 506B may also represent the transmitter and receiver being separated by different distances $X_{IR}$. For example, waveform 506A may indicate that the transmitter and receiver are separated by a first distance $X_{IR}$ of 2000 feet and waveform 506B may represent that the transmitter and receiver are separated by a second distance $X_{IR}$ of 500 feet. Alternatively, waveforms 506A and 506B may represent the transmitter and receiver being separated by an equal distance of 50 feet for example and the resultant difference in photodiode current between the waveforms is due to a change in optical gain characteristics through the use of different lenses or different focal lengths, etc. In this case the waveform 506A may illustrate an IR receiver 204 that does not have a focusing lens 302B in front of the IR photodiode 304 to achieve optical gain and waveform 506B may illustrate an IR receiver 204 that does have a focusing lens 302B in front of the IR photodiode 304 of the IR receiver 204.

FIG. 5D illustrates waveform 508 which is the audio current that is presented to the speaker. The current amplitude of the waveform 508 is amplified from that of the current amplitude of waveform 506A or 506B, illustrated in FIG. 5C, in order to properly drive the speaker 208. The frequency and amplitude of the waveform 508 is representative of the audible output generated by the speaker 208.

In this manner, the IR communication devices 200 at each end directly modulate an audible sound or voice in the audible frequency band between approximately 20 Hz to 20 kHz into an IR signal at the transmitting end for transmission over an IR communication channel and demodulate the received IR signal into an audible sound or audible voice sound between approximately 20 Hz to 20 kHz on the receiving end.

The disclosed embodiment does not employ a modulated center carrier frequency in order to achieve a lower cost. However, a center carrier frequency may be employed with the audible voice or sound modulated or mixed onto a center carrier frequency by using amplitude modulation (AM) or frequency modulation (FM) and then provided to the IR LED for transmission using an IR signal. Corresponding reception and demodulation or demixing on the receive end is used in order to obtain the baseband signal of the audible voice sound or audible sound. Details of this alternate embodiment of the infrared communication device would be understood by those ordinarily skilled in the art after reading through this disclosure.

While certain exemplary embodiments have been described and shown in the accompanying drawings, it is to be understood that such embodiments are merely illustrative of and not restrictive on the broad invention, and that this invention not be limited to the specific constructions and arrangements shown and described since various other modifications may occur to those ordinarily skilled in the art after reading the detailed description. Rather, the invention should be construed according to the claims that follow below.

What is claimed is:

1. A toy for voice communication comprising:
   a housing having a first end and a second end;
   an infrared transceiver coupled to the housing at the first end, the infrared transceiver to transmit a transmit voice signal over a first infrared beam and to receive a received voice signal over a second infrared beam;
   a microphone coupled to the housing at the second end, the microphone to receive a sound and generate the transmit voice signal for transmission on the first infrared beam, and
   a speaker coupled to the housing between the first end and the second end, the speaker to transduce the received voice signal received from the second infrared beam into a reproduced sound.

2. The toy of claim 1, further comprising:
   a talk switch coupled to the housing, the talk switch to enable transmission of the transmit voice signal over the first infrared beam.

3. The toy of claim 2, wherein
   the talk switch further disables the transduction of the received voice signal into the reproduced sound.

4. The toy of claim 1, wherein
   the infrared transceiver includes an infrared light emitting diode and an infrared photodiode, the infrared light emitting diode to transmit the transmit voice signal over the first infrared beam and the photodiode to receive the received voice signal over the second infrared beam.

5. The toy of claim 4, wherein
   the infrared light emitting diode is electrically coupled to the microphone when the talk switch is enabled to transmit the transmit voice signal over the first infrared beam,
   and the photodiode to receive the received voice signal over the second infrared beam.

6. The toy of claim 4, wherein
   the photodiode electrically coupled to the speaker to receive the received voice signal over the second infrared beam and to transduce the received voice signal into the reproduced sound.

7. A method for communication over an infrared channel, the method comprising:
   aligning a first infrared transceiver at a first end with a second infrared transceiver at a second end to form an infrared channel;
   and,
   at the first end of the infrared channel,
      receiving audible input sounds;
      converting the audible input sounds into a transmit electrical signal, the transmit electrical signal responsive to a spectrum of the audible input sounds;
      converting the transmit electrical signal into an infrared signal, the infrared signal responsive to the spectrum of audible input sounds; and
      transmitting the infrared signal over the infrared channel.

8. The method of claim 7, further comprising:
   prior to converting the transmit electrical signal,
      amplifying the magnitude of the transmit electrical signal.

9. The method of claim 7, further comprising:
   at the second end of the infrared channel,
      receiving the infrared signal over the infrared channel;
      converting the infrared signal into a received electrical signal, and
      converting the received electrical signal into audible output sounds, the audible output sounds representing the audible input sounds.

10. The method of claim 9, further comprising:
    prior to converting the received electrical signal into audible output sounds,
    amplifying the magnitude of the received electrical signal.

11. The method of claim 10, wherein
    the amplifying of the magnitude of the received electrical signal is variable to vary the amplitude of the audible output sounds.

12. A toy set for bi-directional voice communication by children, the toy set comprising:
    a first toy infrared (IR) communication device and a second toy IR communication device for voice communication therebetween over one or more infrared communication channels, each of the IR communication devices including
       a microphone to receive and transduce voice sounds into voice transmit signals;
       an infrared transmitter coupled to the microphone, the infrared transmitter to transduce the voice transmit signals into infrared signals of an infrared output light beam,
       an infrared receiver to receive an infrared input light beam and to transduce infrared signals therein into received voice signals; and,
       a speaker coupled to the infrared receiver, the speaker to transduce the received voice signals into audible voice sounds.

13. The toy set of claim 12, wherein, each toy IR communication device, further includes
    a housing to hold components together as a unit.

14. The toy set of claim 12, wherein, each toy IR communication device further includes
a talk switch to enable transmission of the voice transmit signals and disable the speaker.

15. The toy set of claim 14, wherein, each toy IR communication device further includes
a volume to control the amplitude of the audible voice sounds.

16. The toy set of claim 15, wherein, each toy IR communication device further includes
an on/off switch to switch power on and off to the toy IR communication device.

17. The toy set of claim 16, wherein, each toy IR communication device further includes
a battery to provide the power.

18. The toy set of claim 17 wherein, each toy IR communication device further includes
one or more lenses to focus the infrared input light beam into the infrared receiver and to collimate the infrared radiation from the infrared transmitter into the infrared output light beam.

19. The toy set of claim 18, wherein, the one or more lenses are fresnel lenses.

20. The toy set of claim 18, wherein, each toy IR communication device further includes
a sight to assist in pointing the toy IR communication device.

21. The toy set of claim 20, wherein,
the sight includes a lens and an eye cup at one end.

22. The toy set of claim 20, wherein, each toy IR communication device further includes
a housing to hold components together as a unit.

23. A method of bi-directional voice communication between children, the method comprising:
pointing a first toy IR communicator towards a second toy IR communicator;
pointing the second toy IR communicator towards the first toy IR communicator;
receiving a first audible voice at the first toy IR communicator;
transducing the first audible voice into a first electrical transmit voice signal;
transducing and transmitting the first electrical transmit voice signal into infrared voice signals of a first infrared light beam;
receiving the first infrared light beam at the second toy IR communicator;
transducing the infrared signals of the first infrared light beam into a first electrical received voice signal,
coupling the first electrical received voice signal to a first speaker;
and,
transducing the first electrical received voice signal into a reproduced first audible voice at the second toy IR communicator.

24. The method of claim 23, further comprising:
receiving a second audible voice at the second toy IR communicator;
transducing the second audible voice into a second electrical transmit voice signal;
transducing and transmitting the second electrical transmit voice signal into infrared voice signals of a second infrared light beam;
receiving the second infrared light beam at the first toy IR communicator;
transducing the infrared signals of the second infrared light beam into a second electrical received voice signal;
coupling the second electrical received voice signal to a second speaker;
and,
transducing the second electrical received voice signal into a reproduced second audible voice at the first toy IR communicator.

25. The method of claim 23, wherein, the first toy IR communicator and the second toy IR communicator each include
an IR transmitter and an IR receiver to transduce between infrared signals and electrical signals.

26. The method of claim 25, wherein,
the first toy IR communicator and the second toy IR communicator each include
a microphone and a speaker to transduce between electrical signals and audible sounds.

27. The method of claim 23, further comprising:
the transmitting of the infrared voice signals of the first infrared light beam includes
collimating the infrared voice signals into the first infrared light beam;
and,
the receiving of the first infrared light beam includes
focusing the first infrared light beam.

28. The method of claim 24, further comprising:
the transmitting of the infrared voice signals of the second infrared light beam includes
collimating the infrared voice signals into the second infrared light beam;
and,
the receiving of the second infrared light beam includes
focusing the second infrared light beam.

29. A toy IR communicator comprising:
a battery;
an on/off switch having a first pole and second pole, the first pole coupled to the battery and the second pole coupled to a power supply node to provide power thereto;
a microphone to receive an audible voice sound and generate a transmit electrical voice signal;
first operational amplifier coupled to power supply node and having an input coupled to the microphone, the first operational amplifier to generate an amplified transmit electrical voice signal at an output in response to the transmit electrical voice signal;
a first talk switch having a first pole and a second pole, the first pole coupled to first operational amplifier to receive the amplified transmit electrical voice signal;
an infrared transmitter coupled to the second pole of the first talk switch and the power supply node, the infrared transmitter to transduce the amplified transmit electrical voice signal into an infrared voice signal of an infrared output light beam in response to the first talk switch being closed;
an infrared receiver to receive an infrared input light beam and to transduce infrared signals therein into a received electrical voice signal;
a second talk switch having a first pole and a second pole, the first pole of the second talk switch coupled to the infrared receiver, the second pole of the second talk switch coupled to the power supply node through a resistor;

an audio amplifier having an input and an output, the input of the audio amplifier coupled to the second pole of the second talk switch, the audio amplifier to receive the received electrical voice signal in response to the second talk switch being closed and to variably amplify the received electrical voice signal into an amplified received electrical voice signal on its output; and, a speaker coupled to the output of the audio amplifier, the speaker to transduce the amplified received electrical voice signal into an reproduced audible voice sound.

30. The toy IR communicator of claim 29, wherein a volume control to control the gain of the audio amplifier to variably amplify the received electrical voice signal.

31. The toy IR communicator of claim 29, wherein the first talk switch is normally open and the second talk switch is normally closed, and the toy IR communicator further includes
a talk button to close the first talk switch and open the second talk switch.

32. The toy IR communicator of claim 29, wherein the infrared transmitter includes
a infrared light emitting diode (LED) having a first terminal coupled to the power supply node and a second terminal coupled to a collector of a bipolar junction transistor, and the bipolar junction transistor having a base coupled to the second pole of the first switch and an emitter coupled to ground through a resistor.

33. The toy IR communicator of claim 29, wherein the infrared receiver includes a photo diode (LED) having a first terminal coupled to ground and a second terminal coupled to and input of a second operational amplifier, and the second operational amplifier having an output coupled to the first pole of the second talk switch.

34. The toy IR communicator of claim 29, wherein the audio amplifier includes a variable resistor having a first terminal coupled to the second pole of the second talk switch and a second terminal coupled to an input of a third operational amplifier, the variable resistor to control the gain of the audio amplifier to variably amplify the received electrical voice signal, and the third operational amplifier having an output coupled to the speaker.

35. The toy IR communicator of claim 29 further comprising:

one or more lenses to focus the infrared input light beam into the infrared receiver and to collimate the infrared radiation from the infrared transmitter into the infrared output light beam.

36. The toy IR communicator of claim 35, wherein, the one or more lenses are fresnel lenses.

37. The toy IR communicator of claim 29 further comprising:

a housing to hold components together as a unit.

38. The toy IR communicator of claim 37, wherein, the housing includes
a sight to assist in pointing the toy IR communicator.

39. The toy IR communicator of claim 38, wherein, the sight includes a lens and an eye cup at one end.

* * * * *